Jan. 24, 1956 M. E. KROM ET AL 2,732,435

CHANNEL SELECTING CIRCUIT

Filed Oct. 11, 1954 4 Sheets-Sheet 1

INVENTORS: M. E. KROM
F. C. KUCHAS
BY
C. Mattice
ATTORNEY

CHANNEL SELECTING CIRCUIT

Filed Oct. 11, 1954 4 Sheets-Sheet 2

INVENTORS: M. E. KROM
F. C. KUCHAS
BY C. Mattice
ATTORNEY

INVENTORS: M. E. KROM
F. C. KUCHAS
BY C. Mattice
ATTORNEY

CHANNEL SELECTING CIRCUIT

Filed Oct. 11, 1954 4 Sheets-Sheet 4

INVENTORS: M. E. KROM
F. C. KUCHAS
BY C. Mattice
ATTORNEY

United States Patent Office 2,732,435

Patented Jan. 24, 1956

2,732,435

CHANNEL SELECTING CIRCUIT

Myron E. Krom, Convent Station, N. J., and Francis C. Kuchas, Manhasset, N. Y., assignors to Bell Telephone Laboratories, Incorporated, New York, N. Y., a corporation of New York Application October 11, 1954, Serial No. 461,448

10 Claims. (Cl. 179—22)

This invention relates to telephone systems and more particularly to dial telephone systems in which connections are set up by means of common control equipment. It is an object of the invention to increase the efficiency of such control equipment.

More specifically, the invention provides an improvement in such crossbar switching systems as that disclosed in Patent 2,585,904 to A. J. Busch granted February 19, 1952. In such systems connections are set up by means of control circuits known as markers. The crossbar switches are arranged on frames known as line link frames and trunk link frames, each frame having a plurality of primary switches and a plurality of secondary switches. Each primary switch has access to each secondary switch on the same frame by means of links and each line link frame has access to each trunk link frame by means of links known as junctors. According to the standard crossbar arrangement, there will be a plurality of paths or channels each including a line link, a trunk link and a connecting junctor by which any line appearing on the line link frame may be connected with any trunk on a trunk link frame. When the control circuit or marker has identified a line and a trunk which are to be connected together and, thereby the frames on which such circuits are located, it then connects with and tests the links and junctors comprising the channels which may be used for connecting the identified line and trunk.

The sleeve conductors of these links and junctors are marked busy by the presence of the ground which serves to maintain the circuits for the hold magnets used in establishing the connection of which the associated link or junctor is a part. The removal of this ground immediately marks the associated line or junctor as idle but an appreciable time is required for the hold magnets to restore the vertical operating bar and to permit the select finger to return to its normal position. Therefore, if a link or junctor is selected for use immediately after the removal of the busy ground, it would be possible to reoperate the corresponding hold magnet before the select finger is normal, and to set up a false double connection. To avoid this possibility in the system shown in the above-identived Busch patent, a time interval is measured between the selection of an idle channel and the closure of the hold magnet operating circuits. Since the over-all operating time for the marker is quite short and each marker serves a large number of calls, even a small saving in the time required for one marker to complete its functions may permit a saving in the number of markers required for an office and, since the marker is a complex and expensive piece of equipment, the saving of even one marker in an office is economically worth-while.

In accordance with the present invention means is provided to prevent the selection of a channel when any element of the channel is undergoing release at the time the test is made, so that a selected channel may be immediately seized and operated.

It is well known that when the circuit of an electromagnet is opened the collapse of the current through the windings of the magnet generates a voltage surge. The present invention takes advantage of this phenomenon to indicate that the particular element should not be selected.

Therefore, in accordance with the present invention, auxiliary channel testing means is provided, responsive to the negative surge resulting from the opening of the hold magnet circuit, to mark the channel unselectable.

More specifically, means is provided, in parallel, for simultaneously testing each link of a channel for busy ground and for the negative surge, with means under the control of either testing means for marking the channel unselectable.

A feature of the invention lies in the connection of a unidirectional conducting device with each channel element, said device poled to respond only to a negative surge, with means controlled by the unidirectional conducting device of each channel for indicating that the channel is unselectable.

In accordance with a further feature of the invention the unidirectional conducting devices are rectifiers.

An additional feature of the invention lies in means controlled by said unidirectional device for operating one of the ground testing devices to mark the channel unselectable.

These and other features of the invention will be more clearly understood from a consideration of the following description read in connection with the attached drawings in which.

As previously stated, this invention is especially valuable in such a system as that disclosed in the above-identified Busch patent and reference is made to that patent for a complete description of the system in which the present invention is to be used.

Figure 1:
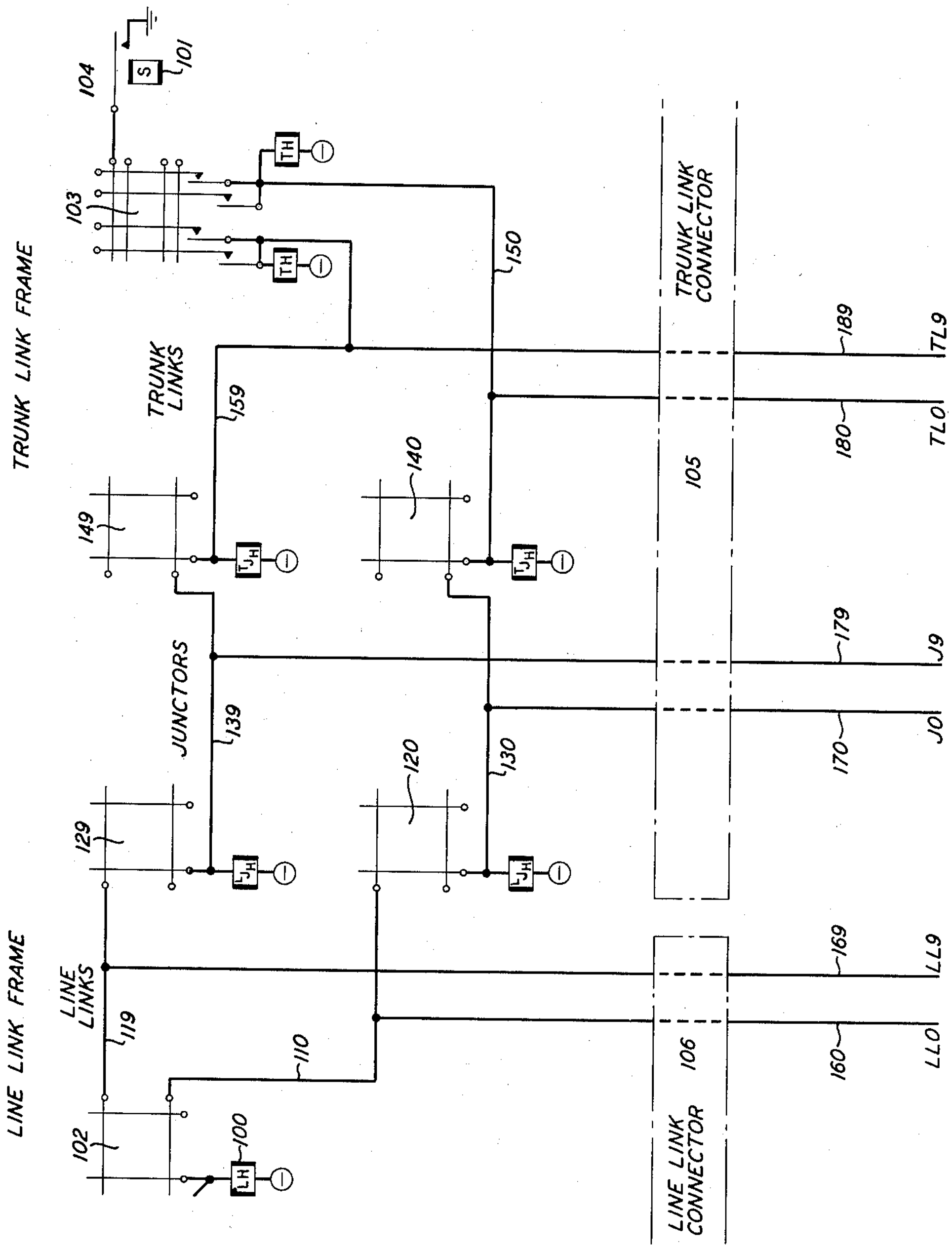
Fig. 1 shows in diagrammatic form a set of crossbar switches showing two channels through the switches and the testing leads for the elements of those channels.

Referring first to Fig. 1, this figure shows a line link frame and a trunk line frame each of which includes a plurality of primary and secondary crossbar switches, only the sleeve conductors of these switches being shown. The hold magnets attached to these sleeve conductors are originally operated by the marker but are held operated from ground at the contact of a relay like relay 101 in the trunk circuit during conversation. When the conversation is terminated and the trunk circuit is released, relay 101 releases and removes ground from the sleeve conductors to in turn release the hold magnets and permit the select fingers, which have been held under the control of the hold magnets, to restore.

As disclosed in detail in the above-identified Busch patent, a line, for example the line to which hold magnet 100 is individual, may be connected with the trunk circuit 104, in which sleeve relay 101 is located, over any one of 10 paths, two of which are shown. The first path may be traced by way of primary line switch 102, line link 110, secondary line switch 120, junctor 130, primary trunk switch 140, trunk link 150 and secondary trunk switch 103. The second path may be traced by way of primary line switch 102, line link 119, secondary line switch 129, junctor 139, primary trunk switch 149, trunk link 159 and secondary trunk switch 103. Eight other similar paths are available leading through eight other secondary line switches and eight other primary trunk switches.

When the marker has selected or otherwise identified the frame on which the trunk 104, to be connected, is located, it operates trunk line connector 105 giving access to that frame and thereafter operates the line link connector 106 giving access to the frame on which the identified line is located. As described in the above-identified Busch patent, the operation of the trunk link connector connects the trunk links 150 to 159 to the trunk link test conductors 180 to 189 and connects the junctors 130 to 139 to the junctor test conductors 170 to 179. The operation of the line link connector 106 connects the line links 110 to 119 to the line link test conductors 160 to 169.

Figure 2:
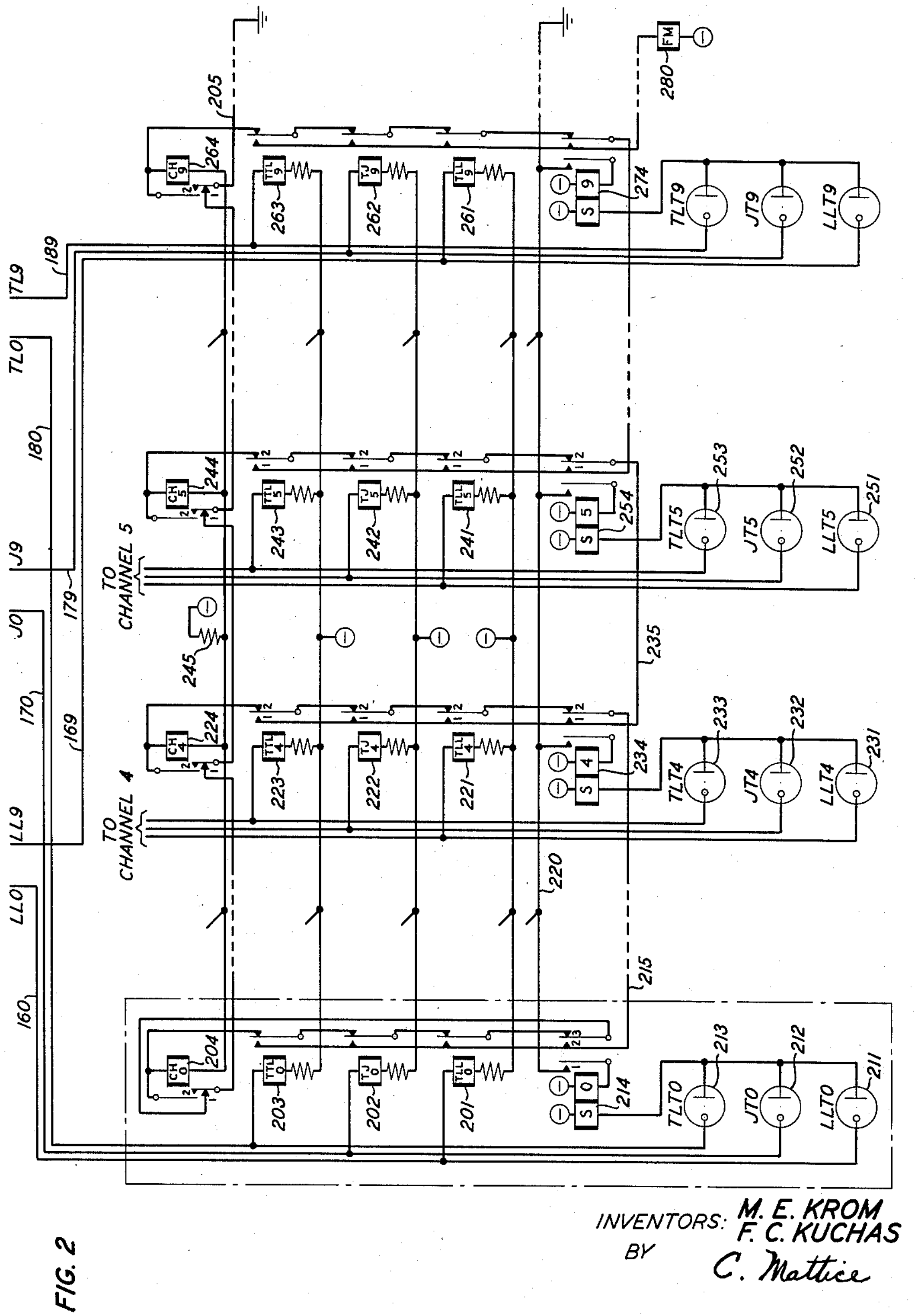
Fig. 2 shows the ordinary ground testing relays for the elements of four channels together with the supplementary testing equipment for the same elements, employing diodes.

In the marker, as shown in Fig. 2, conductors 160 to 189 are connected with sets of channel testing relays each set including a line link test relay, a trunk link test relay and a junctor test relay and a channel-idle relay. In addition, in accordance with the present invention, each set includes a surge test relay and a plurality of diodes connected in parallel with the test relays. For example, the test conductors 160, 170 and 180 which are connected, as above described, to the first channel are connected to the first channel test set. Conductor 160 is connected to the winding of the relay 201, conductor 170 is connected to the winding of relay 202 and conductor 180 is connected to the winding of the relay 203. The windings of relays 201, 202 and 203 are connected to negative battery through individual resistances and, if ground is present on the connected link or junctor, the test relay will operate. Conductor 160 is also connected to one terminal of diode 211, conductor 170 is connected to one terminal of diode 212 and conductor 180 is connected to one terminal of diode 213. The opposite terminals of these three diodes are connected together and to negative battery through the left winding of surge test relay 214. If ground is removed from one of the conductors 160, 170 or 180 at the moment that the test circuit is connected to these conductors, there will be a heavy surge on that conductor and the corresponding diode will break down and cause relay 214 to operate.

Assume, for example, that line link 110 is idle, junctor 120 is busy and that ground has just been removed from trunk line 150. Battery through the associated hold magnet will be extended from conductor 110 to the winding of relay 201 and that relay will not operate. Ground on busy junctor 120 will be extended to the winding of relay 202 causing that relay to operate. Since ground has been disconnected from conductor 150, relay 203 will not operate but, due to the heavy negative surge responsive to the disconnection of battery from conductor 150, tube 213 will break down operating relay 214. Relay 214 locks in the circuit from battery through its right winding and over its contact 1 to ground on conductor 220.

Assume also that some one of the test relays is operated in the channel-test circuits of channels 2 and 3, that the trunk link test relay 223 is operated and that all the elements of channel 5 are idle with the result that all of the relays 241, 242 and 243 are not operated, and that none of the tubes 251, 252 or 253 have broken down so that relay 254 is also not operated.

A brief interval after the test circuits are closed, the marker connects ground to conductor 205 for selecting an idle channel. This circuit extends over the normally closed contacts of all of the channel-idle relays 264, 244, 224 and 204, and over the similar contacts of the intermediate channel relays (not shown) to the armature of relay 214. Since relay 214 is operated, the circuit is extended over contact 2 of relay 214 to conductor 215 leading to the next set of channel-test relays where the circuit is further extended to the armature of relay 234, over the contacts 2 of relays 234, 221 and 222 over contact 1 of operated trunk link test relay 223 to conductor 235 and over the contacts 2 of the non-operated surge test relay 254, line link test relay 241, junctor test relay 242 and the trunk test relay 243 to the winding of channel relay 244 and battery through resistance 245. Therefore channel relay 244 operates and opens at its contact 1 the operating circuit for the channel relays and locks over its contact 2 and contact 1 of higher numbered channel relays to ground on conductor 205. With relay 244 operated, the marker proceeds, as described in the above-identified Busch patent, to operate the proper select and hold magnets to set up a connection using the elements of the selected channel. However, with the present channel testing arrangement the time interval intervening between the operation of the channel-select relay and the operation of the switch magnets may be materially reduced or omitted.

If none of the channels is idle, the channel-select circuit is extended to the winding of relay 280. Relay 280, when operated, causes the marker to test additional groups of channels if provided, or to select another trunk, or to otherwise disposed of the call.

Figure 3:
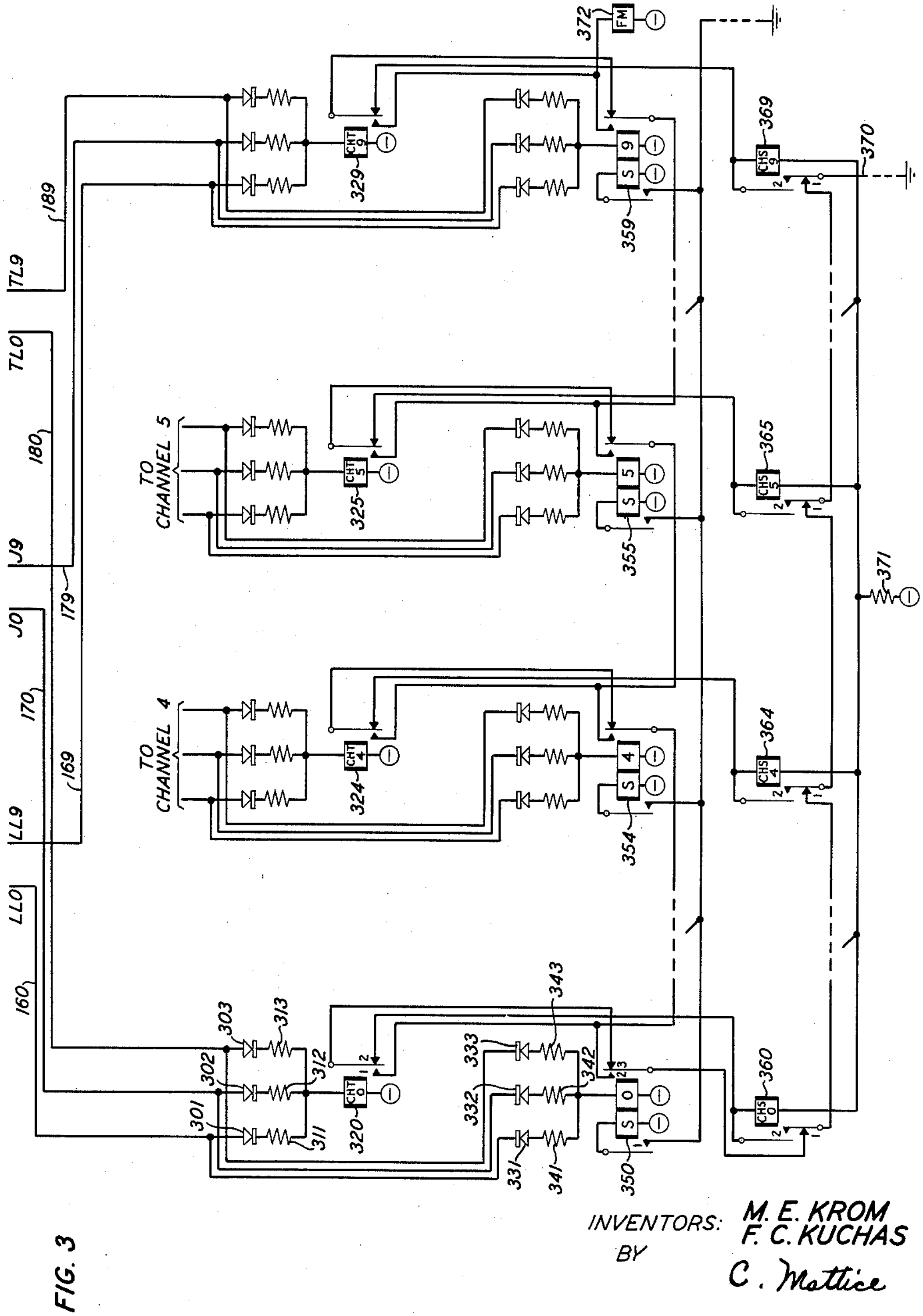
Fig. 3 shows a modified arrangement for testing channel elements employing unidirectional elements such as rectifiers.

Fig. 3 shows an alternative method of channel testing. In this arrangement each of the link test conductors is connected in parallel to two unidirectional conducting devices such as rectifiers, one poled in one direction and the other poled in the opposite direction. The three rectifiers connected to the elements of a channel which are poled in the same direction are connected in multiple to the winding of a relay, for example, conductor 160 connected to the line link of the first or 0 channel, is connected to rectifiers 301 and 331. Conductor 170, connected to the junctor of the 0 channel, is connected to rectifiers 302 and 332, while conductor 180, connected to the trunk link of the 0 channel, is connected to rectifiers 303 and 333. Rectifiers 301, 302 and 303 are connected through resistances 311, 312 and 313, respectively, in multiple to the winding of the channel-busy relay 320. Rectifiers 301, 302 and 303 are so poled that they are conducting in the direction of current flow resulting when ground is connected to conductors 160, 170 or 180. Therefore, if any one of the channel elements is busy, relay 320 is operated, but the busy ground cannot be fed back to the non-busy elements.

Similarly, rectifiers 331, 332 and 333 are connected through resistances 341, 342 and 343 in multiple to the right winding of relay 350. In this case, the rectifiers are poled in the opposite direction, and the values of resistances 341, 342 and 343 are so selected that relay 350 receives operating current only if a high negative voltage, such as that generated by the surge resulting from the opening of the hold magnet circuit, appears on at least one test conductor. Since the surge voltage is not a steady condition, relay 350 is provided with a locking winding by which, when it is energized, it locks to off-normal ground. Similar testing arrangements are provided for each of the channels.

In addition to the testing arrangement above described, there is a channel-select relay for each channel. A short time after the testing circuits have been closed, sufficient to permit the testing relays to operate, the marker prepares a channel selecting circuit by connecting ground to conductor 370. This circuit extends from ground on conductor 370 over the normally closed contacts 1 of all of the channel-select relays 369 to 360 to the armature of the surge test relay 350 of channel 0. If this relay is operated, indicating that a surge occurred on one of the channel elements when the test was made, the channel-select circuit is extended over contact 2 of relay 350 to the armature of the surge test relay for channel 1. If the surge test relay 350 of channel 0 is not operated, the channel-select circuit is extended over contact 3 of relay 350 to the armature of the channel-busy relay 320. Here again, if the channel-busy relay 320 is operated, indicating that one of the channel elements is busy, the channel-select circuit is extended over contact 1 of relay 320 to the armature of the surge test relay for channel 1, but if relay 320 is not operated, indicating that all of the elements of channel 0 are idle, the channel-select circuit extends over contact 2 of relay 320 through the winding of channel-select relay 360 of the 0 channel to battery through resistance 371. Relay 360 operates in this circuit, locks over its contact 2 to ground over the normal contacts of the other channel-select relays and opens at its contact 1 the operating circuit for all of the channel-select relays. The operated channel-select relay 360 serves in the manner described in the above-identified Busch patent to control the operation of the proper select and hold magnets for setting up the desired connection. It may be noted that, if no channel is available, the channel-select circuit is extended to the winding of relay 372 which operates and functions in the manner described for relay 280. As mentioned in the case of Fig. 2, the select and hold magnets may be operated immediately following the operation of the channel-select relay, thereby avoiding the delay employed in the system disclosed in the Busch patent.

Figures 4, 5, 6, 7:
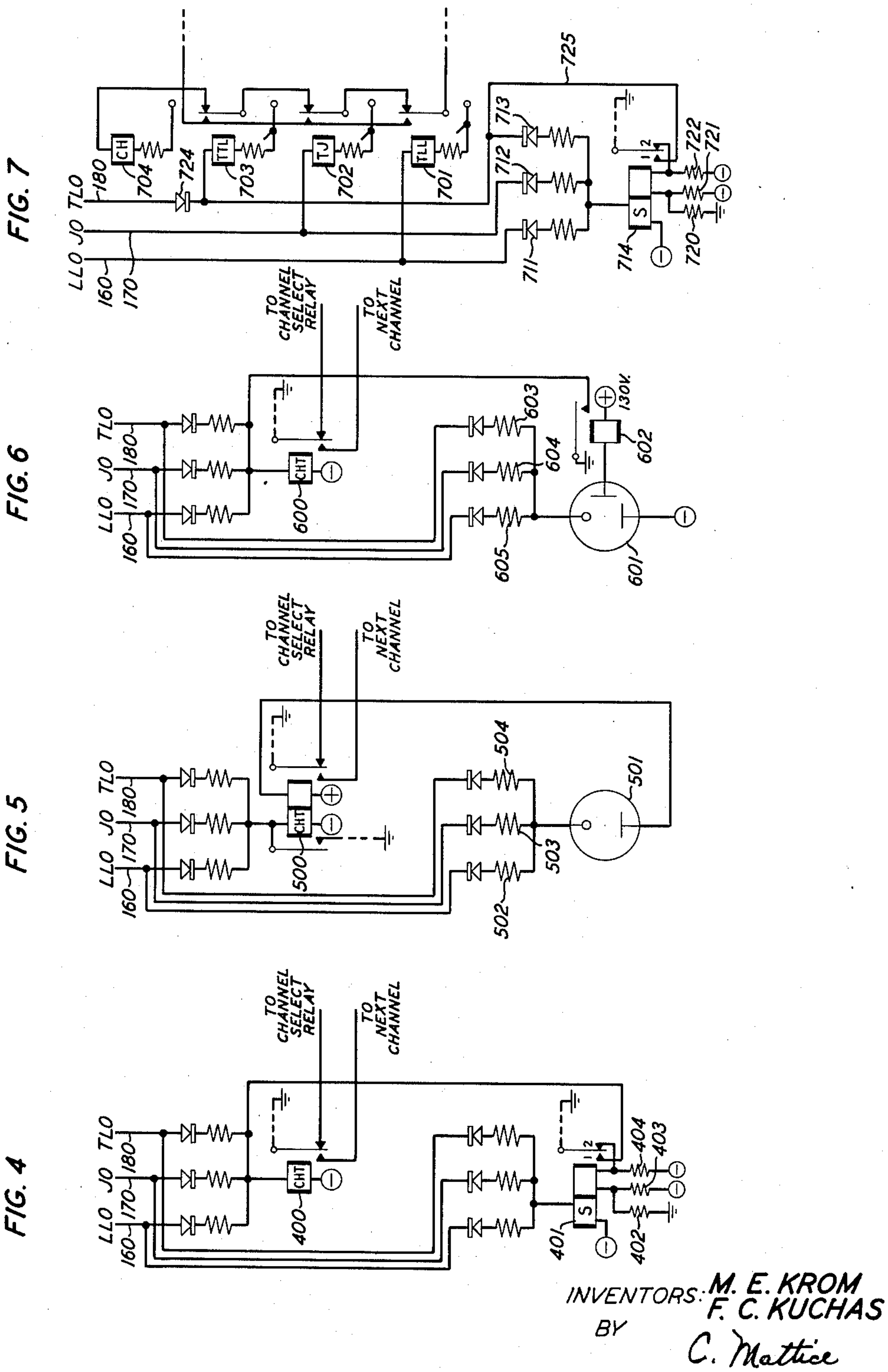
Fig. 4 shows a modified arrangement for operating the channel-busy indicator using a relay per channel.
Fig. 5 is similar to Fig. 4 using a diode for operating the channel-busy indicator.
Fig. 6 is similar to Fig. 4 using a triode for operating the channel-busy indicator.
Fig. 7 shows a modified arrangement in which the surge testing equipment operates one of the regular ground testing relays.

Fig. 4 shows a modification of the testing arrangement of Fig. 3. In this modification the channel-busy relay 400 operates if any of the elements of the channel are busy as in the case of Fig. 3 while relay 401 operates through its primary winding if a negative surge is present on any of the test conductors at the moment the test is made. The second winding of relay 401 is connected between a reduced potential provided by the voltage divider composed of resistances 402 and 403 and full battery potential through resistance 404. With relay 401 non-operated, ground is connected over its contact 2 in shunt of the battery through resistance 404 so that relay 401 is biased in a direction to hold its contact 2 closed. When the primary winding is energized by a voltage surge, relay 401 opens its contact 2 and the bias provided by the secondary winding is in a direction to assist in holding its contact 1 closed. With contact 1 of relay 401 closed, a direct circuit is provided for operating relay 400 independent of the busy condition of conductors 160, 170 and 180. With channel-busy relay 400 non-operated, the associated channel-select relay is operated but if relay 400 is operated, the channel selecting circuit is extended to the armature of the next channel-busy relay. It will, of course, be understood that the connections of battery or ground to the secondary winding of relay 401 or both which have been shown as permanent would, in practice, be made at a suitable stage in the operation of the marker.

Fig. 5 is similar to Fig. 4. Relay 500 is the regular channel-busy relay and operates as in the previous case when any of the channel elements is busy. The surge testing rectifiers are connected in multiple to one terminal of diode 501, the other terminal of which is connected through a separate winding of channel-busy relay 500 to positive battery so that, if the voltage surge is present when the channel is tested, surge detecting tube 501 will break down and cause the operation of relay 500, which then locks. Resistors 502, 503 and 504, in the surge detecting circuit, have a high resistance to prevent sufficient current flowing when tube 501 breaks down to cause the operation of the hold magnets of idle links of the channel.

A further alternative to Fig. 3 is shown in Fig. 6 where the surge detecting circuits are connected to the control anode of the triode 601, with a relay 602 connected to the main anode and negative battery connected to the cathode. If a surge is present when the test circuit is closed, the tube 601 breaks down, operating relay 602 which closes a direct operating circuit for the channel-busy relay 600. The tube 601 remains conducting and relay 602 remains operated until suitable means is operated for quenching the tube and releasing relay 602. As in the case of Fig. 5, resistors 603, 604 and 605 have a high resistance.

It will be apparent that the arrangements of Figs. 4, 5 and 6 save a considerable amount of wiring since the channel selecting circuit need be carried only over the contacts of the channel-busy relay.

Fig. 7 shows an additional variation of the channel testing arrangement. In this circuit the individual link and junctor testing relays 701, 702 and 703 correspond to the relays 201, 202 and 203 of Fig. 2. The surge testing arrangement is similar to that of Fig. 4. However, a rectifier 724 is included in the trunk link testing circuit connected to relay 703 and is so poled that relay 703 is responsive to ground on conductor 180. If the surge testing relay 714 operates, it connects ground to conductor 725 which is connected to the winding of relay 703, so that relay 703 operates in response to the operation of relay 714. It will be observed that, with respect to conductor 180, rectifier 724 is poled so that the ground connected to the winding of relay 703 will not reach conductor 180. It will also be understood that the rectifier arrangement can be applied to any one of the relays 701, 702 or 703. In this circuit the channel-select relay 704 is operated over the back contacts of relays 703, 702 and 701, none of which is operated if the channel is available.

What is claimed is:

1. In a crossbar telephone system, links for inclusion in telephone connections, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, link testing means in said common control means, means for connecting said link testing means to said link sleeve conductor when it is desired to include said link in a telephone connection, means for indicating that said link is not available for inclusion in a telephone connection, and means in said testing means for operating said indicating means comprising means operated under the control of said hold magnet locking means and means operated in response to said negative surge.

2. In a crossbar telephone system, links for inclusion in telephone connections, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, link testing means in said common control means, means for connecting said link testing means to said link sleeve conductor when it is desired to include said link in a telephone connection, means for indicating that said link is not available for inclusion a telephone connection, and means in said testing means for operating said indicating means comprising means operated under the control of said hold magnet locking means and electronic means operated in response to said negative surge.

3. In a crossbar telephone system, links for inclusion in telephone connections, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, link testing means in said common control means, means for connecting said link testing means to said link sleeve conductor when it is desired to include said link in a telephone connection, means for indicating that said link is not available for inclusion in a telephone connection, and means in said testing means for operating said indicating means comprising means operated under the control of said hold magnet locking means and auxiliary electronic means operated in response to said negative surge.

4. In a crossbar telephone system, links for inclusion in telephone connections, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, link testing means in said common control means, means for connecting said link testing means to said link sleeve conductor when it is desired to include said link in a telephone connection, means for indicating that said link is not available for inclusion in a telephone connection, and means in said testing means for operating said indicating means comprising means operated under the control of said hold magnet locking means and auxiliary means operated in response to said negative surge, said auxiliary means comprising a relay and a rectifier poled to pass said negative surge to said relay.

5. In a crossbar telephone system, links for inclusion in telephone connections, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, link testing means in said common control means, means for connecting said link testing means to said link sleeve conductor when it is desired to include said link in a telephone connection, means for indicating that said link is not available for inclusion in a telephone connection, and means in said testing means for operating said indicating means comprising a relay operated under control of said hold magnet locking means, auxiliary electronic means operated in response to said negative surge and means under control of said electronic means for operating said relay.

6. In a crossbar telephone system, links for inclusion in telephone connections, a plurality of said links constituting a channel, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, channel testing means in said common control means, means for connecting said channel testing means to the sleeve conductors of the links constituting said channel when it is desired to include said channel in a telephone connection, means for indicating that said channel is not available for inclusion in a telephone connection and means in said testing means for operating said indicating means comprising means individual to each link operated under the control of said hold magnet locking means and auxiliary means common to said links operated in response to said negative surge on any one of said links.

7. In a crossbar telephone system, links for inclusion in telephone connections, a plurality of said links constituting a channel, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, channel testing means in said common control means, means for connecting said channel testing means to the sleeve conductors of the links constituting said channel when it is desired to include said channel in a telephone connection, means for indicating that said channel is not available for inclusion in a telephone connection and means in said testing means for operating said indicating means comprising means individual to each link operated under the control of said hold magnet locking means, auxiliary means common to said links operated in response to said negative surge on any one of said links and means under the control of said auxiliary means to operate one of said individual means.

8. In a crossbar telephone system, links for inclusion in telephone connections, a plurality of said links constituting a channel, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, channel testing means in said common control means, means for connecting said channel testing means to the sleeve conductors of the links constituting said channel when it is desired to include said channel in a telephone connection, means for indicating that said channel is not available for inclusion in a telephone connection and means in said testing means for operating said indicating means comprising means common to said links operated under the control of the hold magnet locking means of any one of said links and auxiliary means common to said links operated in response to said negative surge on any one of said links.

9. In a crossbar telephone system, links for inclusion in telephone connections, a plurality of said links constituting a channel, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, channel testing means in said common control means, means for connecting said channel testing means to the sleeve conductors of the links constituting said channel when it is desired to include said channel in a telephone connection, means for indicating that said channel is not available for inclusion in a telephone connection and means in said testing means for operating said indicating means comprising first means common to said links operated under the control of the hold magnet locking means of any one of said links, auxiliary means common to said links operated in response to said negative surge on any one of said links and means under the control of said auxiliary means to operate said first means.

10. In a crossbar telephone system, links for inclusion in telephone connections, a plurality of said links constituting a channel, a sleeve conductor for each link, a hold magnet connected between negative battery and said sleeve conductor, common control means, means in said common control means for operating the hold magnet of a link when it is to be included in a telephone connection, means for locking said hold magnet operated over said telephone connection, the release of said telephone connection permitting said hold magnet to release, the release of said hold magnet generating a negative surge in said sleeve conductor, channel testing means, means for connecting said channel testing means to the sleeve conductors of the links constituting said channel when it is desired to include said channel in a telephone connection, channel-busy indicating means, and means in said testing means for operating said channel-busy means comprising a rectifier connected to each of said link sleeve conductors and connected in multiple to said channel-busy relay, said rectifiers poled to cause said channel-busy relay to operate under the control of said hold magnet locking means, a surge detecting relay, a second rectifier connected to each of said link sleeve conductors, said second rectifiers connected in multiple to said surge indicating relay and poled to cause said surge indicating relay to operate in response to said negative surge and means under the control of said surge indicating relay to operate said channel-busy relay.

No references cited.